United States Patent Office 3,024,288
Patented Mar. 6, 1962

3,024,288
POLYNITRO ALCOHOL AND ITS PREPARATION
Karl Klager, Monrovia, Calif., assignor, by mesne assignments, to Aerojet-General Corporation, Azusa, Calif., a corporation of Ohio
No Drawing. Filed Aug. 17, 1951, Ser. No. 242,437
5 Claims. (Cl. 260—635)

This invention relates to polynitro compounds and in particular to a process for forming the same.

The object of my invention is to provide an efficient procedure for the preparation of polynitro compounds from mono nitro compounds.

A further object of this invention is to provide a practical procedure for the preparation of polynitro compounds containing functional groups.

A still further object of the invention is to provide a procedure for the formation of polynitro compounds in which the product is isolated from the reaction mixture without previous isolation of intermediates.

Heretofore polynitro compounds have been formed in the laboratory by an oxidative nitration process. When this process is used on a small scale it gives excellent yields and is relatively simple to perform. However, when it is attempted to apply the process to produce larger quantities, even when the amount is as small as 250 grams, the yields begin to drop far below a practical level.

Previous methods for the preparation of polynitro compounds were essentially as follows: A mononitro compound is converted to its aci-salt with an alkali metal hydroxide such as sodium or potassium hydroxide and this is then allowed to form a complex with sodium nitrite. To this complex is then added a solution of silver nitrate as rapidly as is possible, and the resultant product is isolated from the reaction mixture after removal of the precipitated metallic silver. The yields of product, however, fall off rapidly as the scale of reaction is increased. This is due to the physical limitations that govern the rate at which the silver nitrate can be added. According to my invention, I have discovered that a satisfactory yield, far superior to anything heretofore attainable will result when my modified process is employed.

I have discovered that for satisfactory yields the reaction must be carried out within a limited range of the pH. I have found that for satisfactory yields the pH at which reaction occurs must be between 4 and 5. Using the procedure heretofore used such conditions are impossible to maintain particularly on a large scale. In the former procedure the pH of an aci-salt of a nitro compound at the start of the process is generally between 8 and 10 and the pH is not essentially lowered when sodium nitrite is added. The addition of the silver nitrate solution, which has normally a pH in the range between 4 to 5, will cause a gradual pH change from a high to a low value, unless the silver nitrate can be added "all at once" and thereby cause a rapid drop in pH to the lower level. This has not been possible by the older procedure. Therefore, using the old procedure most of the reaction will occur at a pH between 5 and 10, with very little of the reaction taking place at the lower range, and under such conditions only very poor yields of product are recovered.

According to my invention, the improvement in the process occurs due to the maintenance of a pH between 4 and 5 during all stages of the reaction. In my process the complex mixture of aci-nitro salt and sodium nitrite is added to a silver nitrate solution at a pH between 4 and 5 instead of adding the silver nitrate solution to the complex mixture of aci salt and sodium nitrite which from the nature of this system must necessarily be outside of these specified pH limits. The reaction by my procedure is initiated at a pH between 4 and 5 and the entire reaction occurs at this value. The low pH permits the reaction to reach completion in a relatively short time and produces yields which are many times greater than any obtainable by the former process.

The reaction employed in my process comprises reacting a nitro aliphatic compound with sodium or potassium hydroxide to form the corresponding aci-metal nitro salt. Sodium nitrite solution is added thereby forming a complex mixture with the aci-sodium nitro salt. The sodium nitrite aci-sodium nitro salt mixture is then added to a solution of silver nitrate with continued stirring. The reaction is best described by the following equation:

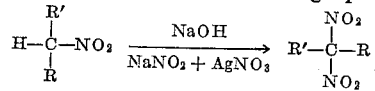

In the above equation R may be hydrogen, any aliphatic radical, cyclo aliphatic radical, or a functionally substituted derivative of any one of these radicals and R' may be hydrogen, any aliphatic radical, cyclo aliphatic radical or a functionally substituted derivative of any one of the radicals. R and R' may be the same or different radicals of the above groups.

In event that it is desired to produce a hydroxy polynitro compound this may be done by introducing any aliphatic aldehyde; preferably formaldehyde, acetaldehyde or propionic aldehyde into the complex reaction mixture of aliphatic mononitro compound, sodium hydroxide, sodium nitrite and silver nitrate.

The process can be best described by referring to a specific procedure setting forth the formation of specific compounds which describe the manner in which the reaction proceeds.

Examples of nitro compounds used in my invention are: 2-nitroethane, 2-nitropropane, 2-nitrobutane, 2-nitroethanol, 2-nitropropanol, 2-nitrobutanol, 1-nitrocyclopentane, 1-nitrocyclohexane, endo-methylene-2-nitrocyclohexane and endo-nitroethylene anthracene. If these nitro compounds were employed in the above reaction, the following compounds would be formed respectively: 2,2-dinitroethane, 2,2-dinitropropane, 2,2-dinitrobutane, 2,2-dinitroethanol, 2,2-dinitropropanol, 2,2-dinitrobutanol, 1,1-dinitrocyclopentane, 1,1-dinitrocyclohexane, endo-2,2'-dinitrocyclohexane and endo-dinitroethylene anthracene.

Formation of 2,2-Dinitro-1-Propanol

A mixture of one mole of nitroethane and one mole of formaldehyde is placed in a 3-necked reactor and cooled to −5° C. A solution of one mole of sodium hydroxide in water is dropped into the flask while the temperature is maintained between 0 to −5° C. After stirring the mixture for one hour, or a longer period of time, one mole of sodium nitrite, dissolved in water, is added and the mixture is stirred for 15 minutes at 0° C. This mixture is then added to a solution of 2 moles of silver nitrate in water, the temperature of the silver nitrate solution being held at 0° C. A white precipitate forms which decomposes after a few seconds depositing a metallic silver layer. During this period of time the temperature is allowed to rise to 20° C. After an hour of continued stirring at which the temperature is held between 20–25° C. the precipitate is filtered off and the solution extracted with ether or other suitable solvents. The ether solution is evaporated and 2,2-dinitro-1-propanol remains as a residue. The melting point of this compound is 87° C. The yield was 77% of theory.

Formation of 2,2-Dinitro-1,3-Propanediol

A mixture of one mole of nitromethane and 2 moles of formaldehyde in water is cooled to −5° C., employing good agitation in a 3-necked reactor as used above. A solution of one mole of sodium hydroxide dissolved in water is added to the flask holding the temperature during the addition to 0° C. and continue the stirring after addition has been completed for one hour. To this solution is added a solution of one mole of sodium nitrite dissolved in water and the mixture is stirred for 15 minutes at 0° C. This prepared mixture is then added into a solution of 2 moles of silver nitrate dissolved in water, the temperature during addition being held at about 0° C. The addition is made with rapid stirring and it is observed that a white precipitate forms which decomposes after its formation leaving a metallic silver deposit. The stirring is continued for one hour and the mixture is filtered from the silver. The yellow solution that results is extracted five times with ether or other solvents, or else the extraction may be carried out continuously. The ether at the end of the extraction is removed by evaporation. The residue is freed from moisture by azeotropic distillation using methylene chloride as the azeotropic medium. After a sufficient portion of the water has been removed the 2,2-dinitro-1,3-propanediol will start to crystallize out. The average yield in this case is about between 55–60% by weight based on the weight of the nitromethane used. The melting point of the material thus obtained was between 145–148° C. The density of 2,2-dinitro-1,3-propanediol is $d^{25}=1.54$.

*Formation of 2,2-Dinitropropane*

A 3-necked reactor provided with a stirrer and thermometer is charged with one mole sodium hydroxide dissolved in water. To this solution is added one mole of 2-nitropropane. The mixture is heated to 70° C. until the solution is complete. After cooling to room temperature 500 ml. of water is added and the solution of one mole of sodium nitrite dissolved in water is introduced.

A second 3-necked reactor provided with a stirrer and thermometer is charged with a solution of 2 moles of silver nitrate dissolved in approximately 1200 ml. of water. The solution is cooled to about +6° C. Into this cold silver nitrate solution the mixture obtained by stirring the first reaction is introduced. A white precipitate forms which soon precipitates as metallic silver. The temperature is then allowed to rise to 24° C. The end pH of the solution is about 5. After 30 minutes stirring the precipitate is filtered and washed with water. The silver mass is then extracted with ether, the water solution being extracted once more with ether. The combined ether solution is dried over sodium sulfate and the ether evaporated. The yield of 2,2-dinitropropane from this process is 121 grams which corresponds to 90.5% of the theoretical value. The melting point of 2,2-dinitropropane thus obtained is between 50–53° C.

An advantage of my process is that there is no substantial loss of the costly silver in the process since it is not necessary to convert the precipitated silver to crystalline silver nitrate. In my process the precipitated silver is dissolved in an excess of $HNO_3$ and raised to a pH of 4 by the addition of any suitable hydroxide. This puts the silver in condition for reuse in the next batch.

I have shown by my novel process that compounds such as 2,2-dinitro-1,3-propanediol, 2,2-dinitro-1-propanol, and 2,2-dinitropropane may be made in large quantities and with good yields. Heretofore all attempts to make these compounds have required a roundabout procedure and the ultimate yield of the material is usually too low to be of any commercial value.

According to my procedure, I have eliminated all of the above difficulties and have succeeded in providing a cheap and quick process whereby polynitro compounds may be produced on a large scale at low cost. Furthermore, the process opens the way to production of a large number of compounds, which have been extremely difficult to produce in the past, such as methyl 4,4-dinitroheptanoate. This compound can also be prepared by starting directly from nitromethane in the manner described above.

I claim:
1. A method of forming 2,2-dinitro-1-propanol which comprises treating one mole of mono nitroethane with one mole of formaldehyde, cooling the mixture to about −5° C., adding to the mixture one mole of sodium hydroxide in water and maintaining the temperature between 0 and −5° C., stirring the mixture, adding a solution of one mole of sodium nitrite in water to the mixture, stirring the mixture at 0° C. and then adding the sodium nitrite complex to a solution of 2 moles of silver nitrate in water in which the pH has been adjusted to between 4 and 5, carrying out the entire reaction at this pH, the temperature of the silver nitrate solution being kept at 0° C., allowing the temperature to rise to room temperature, continuing stirring the mixture for a period of about one hour thereafter, extracting the solution with ether, evaporating the ether thereby leaving a residue of 2,2-dinitro-1-propanol.

2. A process for the formation of 2,2-dinitro-1,3-propanediol which comprises mixing one mole of nitromethane, 2 moles of formaldehyde in water, cooling the mixture to about 5° C., adding to the solution one mole of sodium hydroxide dissolved in water and maintaining the temperature during addition at 0° C., stirring the mixture for one hour after addition has been completed, adding to this mixture a solution of one mole of sodium nitrite in water, stirring the mixture for 15 minutes at 0° C., adding the prepared sodium nitrite mixture to a solution of 2 moles of silver nitrate in water in which the pH has been adjusted to between 4 and 5 the temperature during addition beind held at about 0° C., carrying out the entire reaction at this pH, continuing stirring the mixture for one hour after the solution has been completely added, extracting the solution with ether, and removing the ether by evaporation.

3. The method of preparing a hydroxy polynitro compound having the general formula:

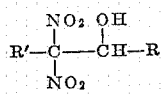

wherein R and R' are radicals selected from the group consisting of hydrogen, lower alkyl, monocyclic alkyl and lower hydroxyalkyl radicals, which comprises adding an alkali metal hydroxide and an alkali metal nitrite stepwise to a mixture of a lower alkanal and a nitro compound having the general formula:

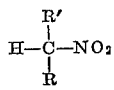

wherein R and R' are as defined above, and subsequently introducing the resultant nitrite complex into a solution of silver nitrate while maintaining the pH in the range of from about 4.0 to 5.0.

4. The method of preparing 2,2-dinitro-1-propanol which comprises adding sodium hydroxide and sodium nitrite, stepwise, to a mixture of nitroethane and formaldehyde at reduced temperatures, and subsequently introducing the resultant nitrite complex into a solution of silver nitrate while maintaining the pH in the range of from about 4.0 to 5.0.

5. The method of preparing 2,2-dinitro-1,3-propanediol which comprises adding sodium hydroxide and sodium nitrite, stepwise, to a mixture of nitromethane and formaldehyde at reduced temperatures, and subsequently introducing the resultant nitrite complex into a solution of silver nitrate while maintaining the pH in the range of from about 4.0 to 5.0.

References Cited in the file of this patent

UNITED STATES PATENTS

| 2,132,352 | Hass et al. | Oct. 4, 1938 |
| 2,132,353 | Hass et al. | Oct. 4, 1938 |
| 2,139,121 | Hass et al. | Dec. 6, 1938 |

FOREIGN PATENTS

| 397,601 | Germany | July 1, 1924 |

UNITED STATES PATENT OFFICE
CERTIFICATE OF CORRECTION

Patent No. 3,024,288                            March 6, 1962

Karl Klager

It is hereby certified that error appears in the above numbered patent requiring correction and that the said Letters Patent should read as corrected below.

Column 3, line 6, and column 4, line 26, for "nitrite", each occurrence, read -- nitrate --.

Signed and sealed this 2nd day of July 1963.

(SEAL)
Attest:

ERNEST W. SWIDER
Attesting Officer

DAVID L. LADD
Commissioner of Patents